United States Patent [19]

Sakakibara et al.

[11] Patent Number: 5,469,304
[45] Date of Patent: Nov. 21, 1995

[54] TAPE MEDIUM RECORDING AND/OR REPRODUCING APPARATUS CAPABLE OF MINIMIZING DEVIATION OF RECORDING POSITION

[75] Inventors: Yoshio Sakakibara, Neyagawa; Makoto Gotou, Nishinomiya; Haruo Isaka, Yawata, all of Japan

[73] Assignee: Matsushita Electric Industrial Co., Ltd., Osaka, Japan

[21] Appl. No.: 320,573

[22] Filed: Oct. 11, 1994

Related U.S. Application Data

[63] Continuation of Ser. No. 86,232, Jul. 1, 1993, abandoned.

[30] Foreign Application Priority Data

Jul. 3, 1992 [JP] Japan .................................. 4-176598

[51] Int. Cl.$^6$ ............................ G11B 27/02; G11B 27/10; G11B 5/584
[52] U.S. Cl. ............................ 360/13; 360/51; 360/77.14
[58] Field of Search ................................ 360/13, 49, 51, 360/64, 73.04, 77.13, 77.14

[56] References Cited

U.S. PATENT DOCUMENTS

| | | | |
|---|---|---|---|
| 4,899,233 | 2/1990 | Yoshida | 360/77.14 |
| 5,008,764 | 4/1991 | Yoshida et al. | 360/77.14 |
| 5,084,786 | 1/1992 | Konno et al. | 360/77.14 |

FOREIGN PATENT DOCUMENTS

| | | |
|---|---|---|
| 0339724 | 11/1989 | European Pat. Off. . |
| 63-34763 | 2/1988 | Japan . |
| 4-114344 | 4/1992 | Japan . |

*Primary Examiner*—Aristotelis Psitos
*Assistant Examiner*—W. Chris Kim
*Attorney, Agent, or Firm*—Ratner & Prestia

[57] ABSTRACT

A tape medium recording and/or reproducing apparatus suited for use in recording or reproducing information on or from a plurality of tracks on a tape medium. Each track has first and second regions defined therein in a direction conforming to the direction of scan. Each first region has a positioning signal recorded therein while a tracking pilot signal is recorded in selected ones of the first regions. The apparatus includes a positioning signal detector for detecting the positioning signal to provide a reproducing position signal, and a reproduction timing generator for generating a reproduction timing signal at a first timing determined by the reproducing position signal. A timing memory is provided to store the length of time from the timing, at which the rotational reference position of a cylinder has been detected, to the first timing. When no positioning signal can be detected, a timing protector generates a pseudo timing signal based on a previously detected timing stored in the timing memory and also for combining the pseudo timing signal with the reproduction timing signal to provide a protection timing signal. A tracking control section performs tracking control in reference to a level determined by the pilot signals sampled by the sample timing signal. The apparatus can perform insert-recording by determining the timing therefor based on the reproduction timing signal.

10 Claims, 5 Drawing Sheets

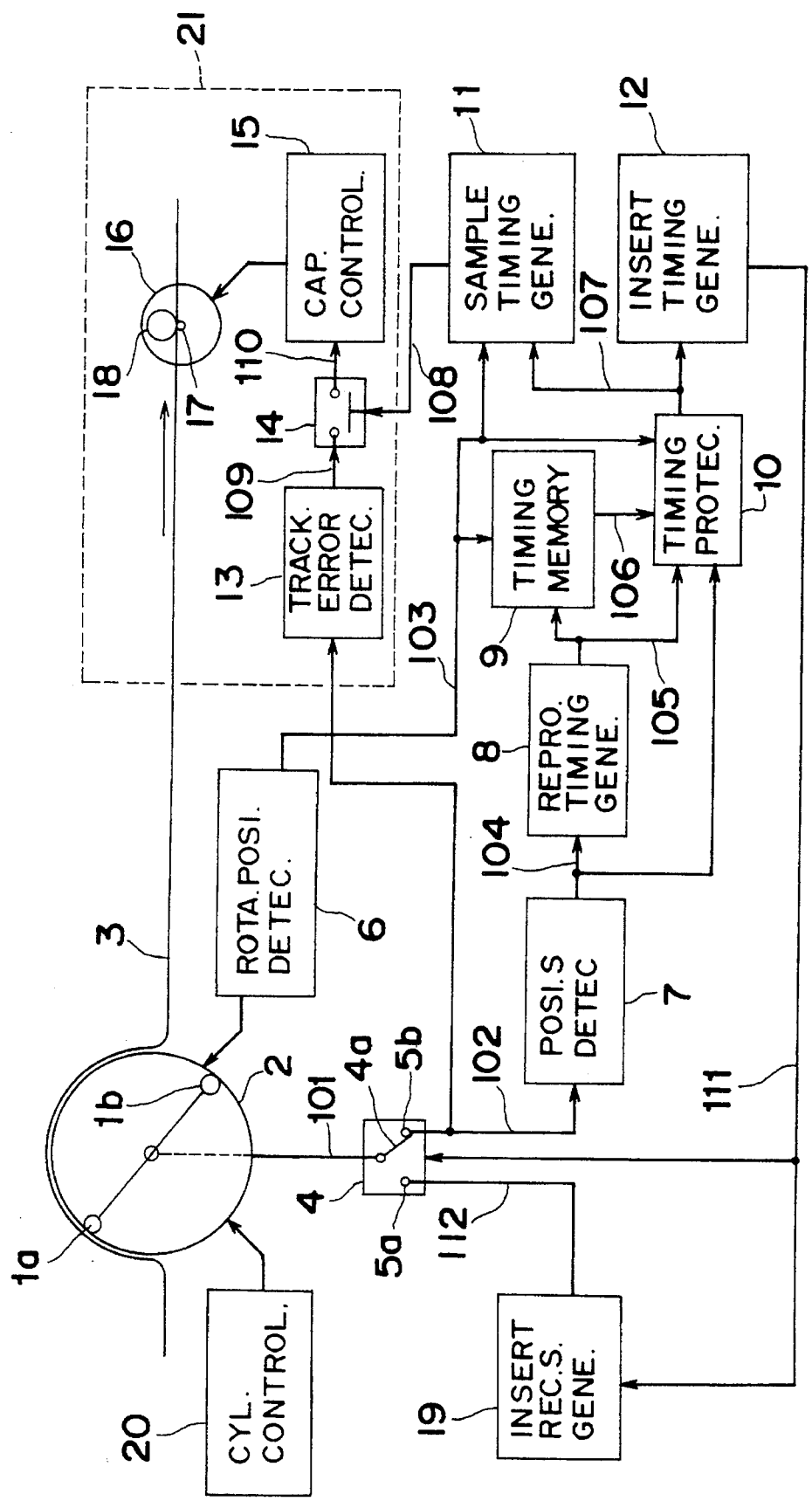

Fig. 2a
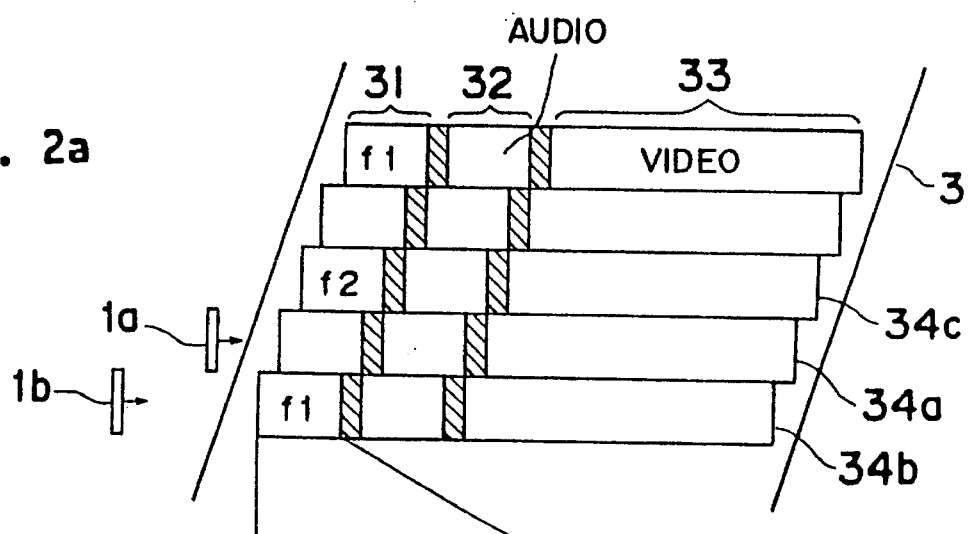
Fig. 2b
Fig. 2c
| SYNC PATTERN | BLOCK ADDRESS | PARITY |
Fig. 3
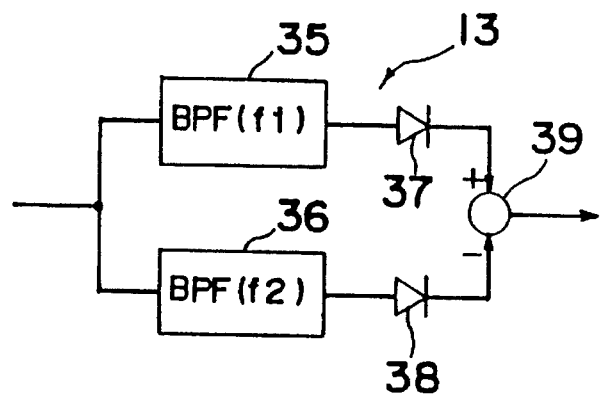

TAPE MEDIUM RECORDING AND/OR REPRODUCING APPARATUS CAPABLE OF MINIMIZING DEVIATION OF RECORDING POSITION

This application is a continuation of application Ser. No. 08/086,232 filed Jul. 1, 1993, abandoned.

BACKGROUND OF THE INVENTION

1. Field of the Invention

The present invention relates generally to a recording and/or reproducing apparatus and, more particularly, to a tape medium recording and/or reproducing apparatus for recording or reproducing images, voices, or other data on or from information tracks obliquely formed on a tape medium.

2. Description of the Prior Art

In a tape medium recording and/or reproducing apparatus for recording or reproducing information such as, for example, images, voices, or other data on or from information tracks obliquely formed on a tape medium, editing is occasionally performed to rewrite a portion of recorded information. For example, in applications where each of the oblique tracks are divided into several regions, and voices and images are recorded on different regions, it is likely that only the voices or the images are desired to be rewritten or other voices or images are desired to be added thereto (this operation is hereinafter referred to as insert editing). In that case, the recording timing has hitherto been determined based on a detected rotational phase of a cylinder. However, the track recording position on the tape varies according to apparatus. When the insert editing is performed by loading the tape in an apparatus different from the apparatus used for recording, there is a good chance that the recording would be performed on a position different from a target position. If the recording position is inaccurate, the recording is performed on a region other than the region which is desired to be rewritten, and hence, the erroneously recorded region can no longer be reproduced.

U.S. patent application Ser. No. 07/865,584, filed on Apr. 9, 1992, discloses a technique of accurately maintaining the recording position during insert editing by making use of a positioning signal recorded on the tape. According to this disclosure, the positioning signal is recorded on a track at a specific location thereof ahead of the region which is desired to be rewritten. During the insert editing, the positioning signal is initially detected, and the recording timing is subsequently determined based on the detected timing, thereby accurately determining the target position on the track in a direction longitudinally thereof. In addition, a pilot signal, which is generally used for tracking control, is recorded on the region on which the positioning signal is recorded. Accordingly, the recording and/or reproducing apparatus can obtain tracking control information by sampling the level of the pilot signal at a timing determined by the positioning signal. Based on this information, tracking control is performed to thereby accurately determine the recording position in a direction widthwise of the track.

However, in this kind of conventional tape medium recording and/or reproducing apparatus, if the head runs off the track during scanning, e.g., if the tracking position deviates in the course of a head pulling-in or aligning process, which is generally carried out at an initial stage of a tracking control operation to align and locate the head to an edge of a target track, or due to external disturbance such as, for example, load variations during a movement of the tape, the positioning signal cannot be detected as a result of a reduction in the level of a reproduced signal. In this case, the problem arises that the recording timing cannot be determined, and also, another problem arises that no tracking error can be detected. Under such conditions, because the tracking cannot be controlled in a correct direction, neither pulling-in nor restoring operation is carried out during the tracking control.

SUMMARY OF THE INVENTION

The present invention has been developed to overcome the above-described disadvantages.

It is accordingly an object of the present invention to provide an improved tape medium recording and/or reproducing apparatus capable of minimizing, during insert editing, a deviation of the recording position from a target position in directions longitudinally of and widthwise of a track, even if no positioning signal can be detected.

The apparatus according to the present invention is particularly suited for use with a tape medium having a plurality of tracks formed thereon, each of which has first and second regions defined therein in a direction conforming to the direction of scan. Each of the first regions has a positioning signal recorded therein while a tracking pilot signal is recorded in selected ones of the first regions.

The apparatus according to the present invention has a rotatable cylinder and at least one magnetic head mounted on the cylinder for rotation together therewith. The magnetic head scans the tracks successively to record or reproduce information on or from the second regions of the tracks on the tape medium. This apparatus includes a rotational position detector means for detecting the rotational reference position of the cylinder to provide a reference position signal indicative thereof, and a positioning signal detector means for detecting the positioning signal in response to a reproduction signal from the head and for outputting a reproducing position signal indicative of the timing at which the positioning signal has been detected. A reproduction timing generator means is provided to generate a reproduction timing signal at a first timing determined by the reproducing position signal. In response to the reproduction timing signal and the reference position signal, a timing memory means operates to measure and store the length of time from the timing, at which the rotational reference position of the cylinder has been detected, to the first timing and also to output a signal indicative of such length of time.

The apparatus also includes a timing protector means for generating, when no positioning signal has been detected, a pseudo timing signal at the first timing and also for combining the pseudo timing signal with the reproduction timing signal to provide a protection timing signal, and a sample timing generator means for outputting a sample timing signal at a second timing determined by the protection timing signal. The head is controlled by a tracking control means to appropriately scan a target track in reference to a level determined by leakage components of the respective pilot signals which have leaked into the reproduction signal from the neighboring first regions in which the pilot signals had been recorded and which have then been sampled by the sample timing signal.

Preferably, the apparatus further includes an insert timing generator means for outputting an insert timing signal at a third timing determined by the protection timing signal, and a recording means for recording on the second region at a timing indicated by the insert timing signal.

In the apparatus of the above-described construction, when the positioning signal has been detected, the reproduction timing signal is generated on the basis of the reproducing position signal, and the timing of the reproduction timing signal with respect to the reference position signal is stored in the timing memory means. In contrast, when no positioning signal has been detected, the timing protector means inserts the pseudo timing signal into the reproduction timing signal on the basis of the previously stored timing, and the sample timing of a tracking error signal is determined on the basis of the output from the timing protector means. Accordingly, the tracking error can always be detected, thus reducing the time period required for the pulling-in operation during the tracking control. Furthermore, even if the tracking position deviates in the presence of external disturbance, the head can be immediately restored to its desired position.

During insert editing, because the timing from which recording on the track is started is determined on the basis of the output from the timing protector means, the positional relationship on the track between already recorded regions and newly rewritten regions can be maintained with accuracy. If the positioning signal cannot be detected by any reason, the recording timing can be determined on the basis of the previously stored timing. Accordingly, insert recording can be performed on a desired position of the track, and hence, an unforeseen accident in which information recorded on the neighboring regions is erroneously erased by overwriting can be avoided. Furthermore, a gap defined between adjoining signal regions and required for editing can be shortened, resulting in an increase in the quantity of recordable information.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein:

FIG. 1 is a block diagram of a tape medium recording and/or reproducing apparatus according to the present invention;

FIG. 2(a) is a schematic view indicating a plurality of tracks obliquely formed on a tape;

FIG. 2(b) is a schematic view of a first region of each of the tracks shown in FIG. 2(a);

FIG. 2(c) is a schematic view indicating the internal construction of each of a plurality of small blocks of the first region shown in FIG. 2(b);

FIG. 3 is a block diagram of a tracking error detector employed in the apparatus of FIG. 1;

DETAILED DESCRIPTION OF THE PREFERRED EMBODIMENTS

Figure 4:
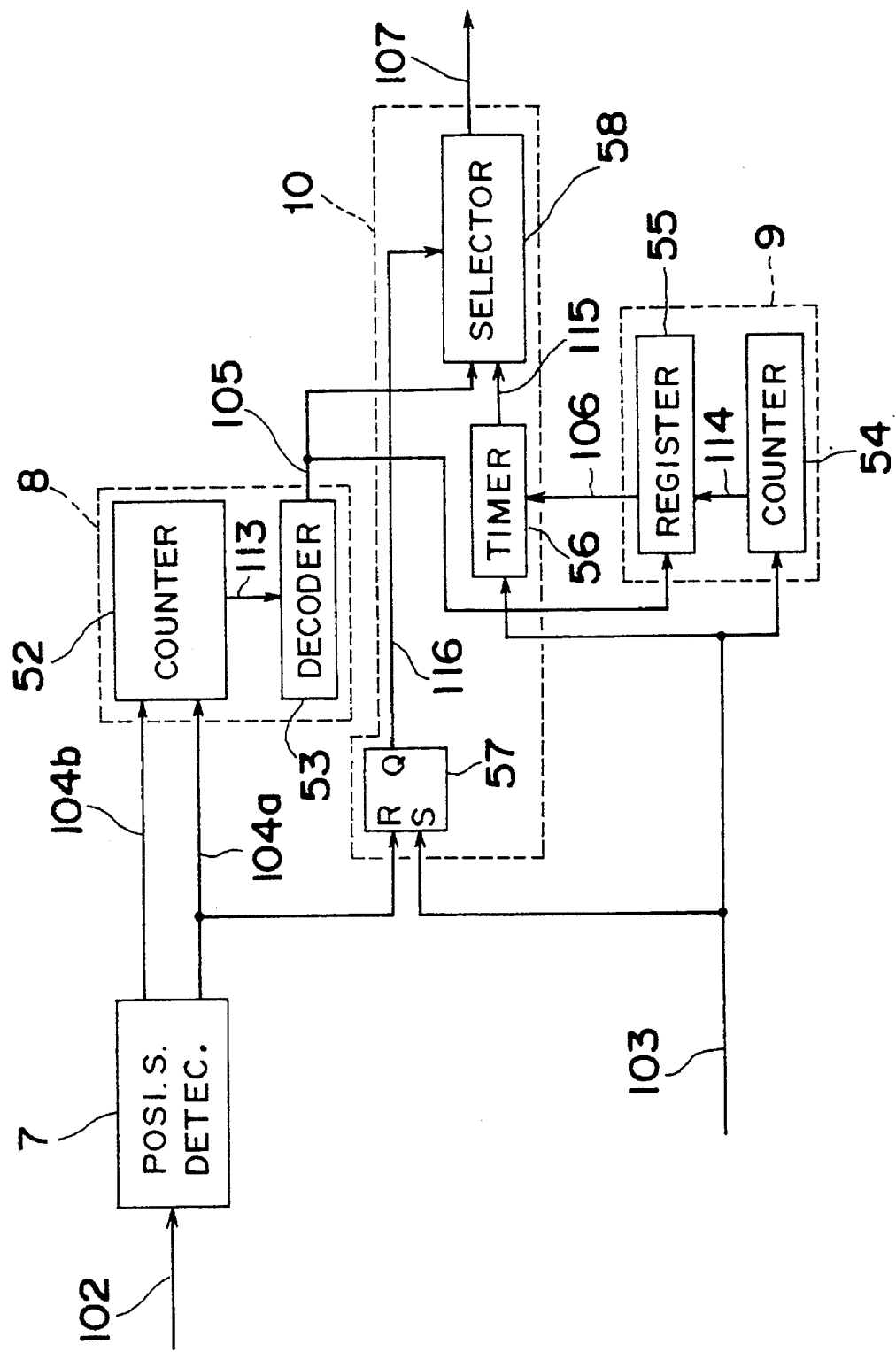
FIG. 4 is a block diagram of a positioning signal detector, a reproduction timing generator, a timing memory, and a timing protector all employed in the apparatus of FIG. 1.

Referring now to the drawings, there is diagrammatically shown in FIG. 1 a tape medium recording and/or reproducing apparatus embodying the present invention. The tape medium recording and/or reproducing apparatus comprises two magnetic heads 1a and 1b, a cylinder 2 on which the two magnetic heads 1a and 1b are mounted, a change-over switch 4, a rotational position detector 6, a positioning signal detector 7, a reproduction timing generator 8, a timing memory 9, and a timing protector 10. The apparatus further comprises a sample timing generator 11, an insert timing generator 12, an insert recording signal generator 19, a cylinder controller 20, and a tracking control section 21. In FIG. 1, the tracking control section 21 is encircled by a dotted line and comprises a tracking error detector 13, a sampler 14, a capstan controller 15, a capstan motor 16, a capstan 17, and a pinch roller 18.

FIG. 2(a) schematically depicts the construction of each of a large number of information tracks obliquely formed on a magnetic tape 3. As shown in FIG. 2(a), a first region 31 is defined on a leading portion of each track, and a positioning signal is recorded on a portion of the first region 31 or the whole first region 31. On this region 31 is also sequentially recorded a pilot signal for tracking use having a frequency different from that of the positioning signal. Tracks having respective pilot signals and those having no pilot signal are alternated. Of the pilot signals, two adjacent pilot signals have different frequencies f1 and f2, respectively. Because the method of recording both the positioning signal and the pilot signal on the same region is disclosed in, for example, European Patent Publication No. 339724, explanation thereof is omitted.

The first region 31 adjoins a second region 32, which also adjoins a third region 33. Different information signals, audio signals and video signals in this case, are recorded on the second region 32 and the third region 33, respectively. A gap required for editing is defined between two adjacent regions and is indicated by hatching in FIG. 2(a).

FIG. 2(b) schematically depicts the first region 31 on an enlarged scale. As shown in FIG. 2(b), the first region 31 is divided into a plurality of small blocks, one of which is shown in detail in FIG. 2(c). Each of the plurality of small blocks is made up of a sync pattern which is used to identify that the block is located in the positioning signal region, a block address indicative of the position inside the region, and a block parity of the block address. The block address is numeric information which is successively counted up from a leading block of the region.

The operation of recording again or additionally recording an information signal on these tracks (insert editing) is discussed hereinafter.

In performing the insert editing, tracking control is initially performed with the use of the pilot signal recorded on the first region 31 so as to render the magnetic head to follow and scan a target track. Under the tracking control, recording is performed during a period in which the magnetic head scans the signal regions.

The tracking control is first discussed. The cylinder 2 is controlled by the cylinder controller 20 so that the cylinder 2 may rotate at a predetermined speed. The two magnetic heads 1a and 1b are mounted on the cylinder 2 at locations 180° opposite each other about an axis of rotation of the cylinder 2 and have respective azimuth angles which differ from each other. During recording or reproduction, the tape 3 is in contact with an outer peripheral surface of the cylinder 2 over an angle of approximately 180°. The rotational position detector 6 detects a rotational reference position of the cylinder 2 and outputs a reference position signal 103 indicative of the timing of detection. The detection is carried out at two locations 180° opposite each other on the cylinder 2. The desired locations are those from which the two magnetic heads 1a and 1b start scanning or locations immediately preceding the start of scanning. The reference position signal 103 is also used for identifying which one of the magnetic heads 1a and 1b is in process of scanning the tape 3, so that a switching between the two magnetic heads 1a and 1b can eventually be performed.

Let it be considered that the rotation of the cylinder 2 causes the head 1a to scan the first region 31 of a track 34a, shown in FIG. 2(a), from the leading end thereof. The switch 4 has a movable element 4a which can be selectively connected to one of fixed contacts 5a and 5b. During reproduction, the movable element 4a is connected to the contact 5b in order to receive signals from the heads 1a and 1b. Since the track 34a is a track having the same azimuth angle as that of the head 1a, a reproduction signal 102 sent from the head 1a through the switch 4 contains not only the positioning signal recorded on the first region 31 of the track 34a, but also leakage components of the pilot signals of frequencies f1 and f2, recorded on tracks 34b and 34c on respective sides of the track 34a, in dependence on the positional deviation of the head 1a relative to the track 34a. These leakage components are detected and compared with each other in the tracking error detector 13 in order to obtain a tracking error signal 109.

FIG. 3 depicts an example of the tracking error detector 13. The tracking error detector 13 shown in FIG. 3 comprises two band-pass filters 35 and 36, two AM detectors 37 and 38, and a differential circuit 39. The f1 and f2 components extracted by the band-pass filters 35 and 36 are converted into direct-current components corresponding to the level thereof by the AM detectors 37 and 38, respectively. The two direct-current components are compared with each other in the differential circuit 39. The output from the differential circuit 39 represents a positional error of the head 1a relative to the track 34a to be reproduced. Thus, the differential circuit 39 outputs the tracking error signal 109.

During a period in which the head 1a is scanning the first region 31, the tracking error signal 109 is sampled by the sampler 14 using a timing signal 108 outputted from the sample timing generator 11. The tracking error signal 109 is then inputted to the capstan controller 15. The generation of the sample timing signal 108 is discussed later.

The capstan 17, driven by the capstan motor 16, conveys the tape 3 sandwiched between it and the pinch roller 18 in a direction longitudinally of the tape 3. The capstan controller 15 controls the rotation of the capstan motor 16 based upon a sampled tracking error signal 110, thereby performing the tracking control in order for the head 1a to scan the track 34a for reproduction. As shown in FIG. 2(a), because the arrangement of the pilot signals is reversed, as viewed from the head 1a, from right to left upon completion of each scanning, the capstan controller 15 reverses the polarity of the tracking error signal 110 inputted thereto for each scanning by the head 1a so that a difference between the pilot signal on the preceding track and that on the next succeeding track may be always obtained. In this way, the tracking control section 21 causes the head 1a to follow the track having the same azimuth angle as that of the head 1a.

When the head 1b scans the track 34b after a 180° rotation of the cylinder 2, no tracking error signal is obtained, and hence, the sampler 14 is not operated. However, because the tape 3 travels a distance about equal to one track length during the 180° rotation of the cylinder 2, the head 1b can reproduce information recorded on a track having the same azimuth angle as that of the head 1b, as is the case with that accomplished by the head 1a.

The sample timing signal 108 is generated as follows.

The reproduction signal 102 is inputted to the positioning signal detector 7. The positioning signal detector 7 detects the positioning signal recorded on the first region 31 and outputs a reproducing position signal 104 indicative of the detection of the positioning signal at a detected timing. The reproduction timing generator 8 outputs a reproduction timing signal 105 indicative of a reference timing of a track being reproduced, at a first timing based on the reproducing position signal 104.

The timing memory 9 stores the timing at which the reproduction timing signal has been given on the basis of the timing of the reference position signal 103 i.e., the first timing, and outputs a stored value 106. The timing protector 10 determines as to whether or not the positioning signal has been detected during a period from the reference position detection timing to the stored first timing using the stored value 106, the reference position signal 103, and the reproducing position signal 104. If no positioning signal has been detected, the timing protector 10 generates a pseudo timing signal at the stored first timing, inserts it into the reproduction timing signal 105, and outputs a protection timing signal 107. In contrast, if the positioning signal has been detected, the timing protector 10 outputs the reproduction timing signal 105 itself as the protection timing signal 107. When the sample timing generator 11 receives the protection timing signal 107 and the reference position signal 103, the sample timing generator 11 allows the protection timing signal to pass therethrough only during the period in which the head 1a scans the track, thereby supplying it, as the sample timing signal 108, to the sampler 14.

The construction and operation of the positioning signal detector 7, reproduction timing generator 8, timing memory 9, and timing protector 10 are discussed hereinafter with reference to FIGS. 4, 5a and 5b.

As shown in FIG. 4, the reproduction timing generator 8 comprises a counter 52 and a decoder 53, and the timing memory 9 comprises a counter 54 and a register 55. The timing protector 10 comprises a presettable timer 56, an RS flip-flop 57, and a selector 58.

Figure 5A:
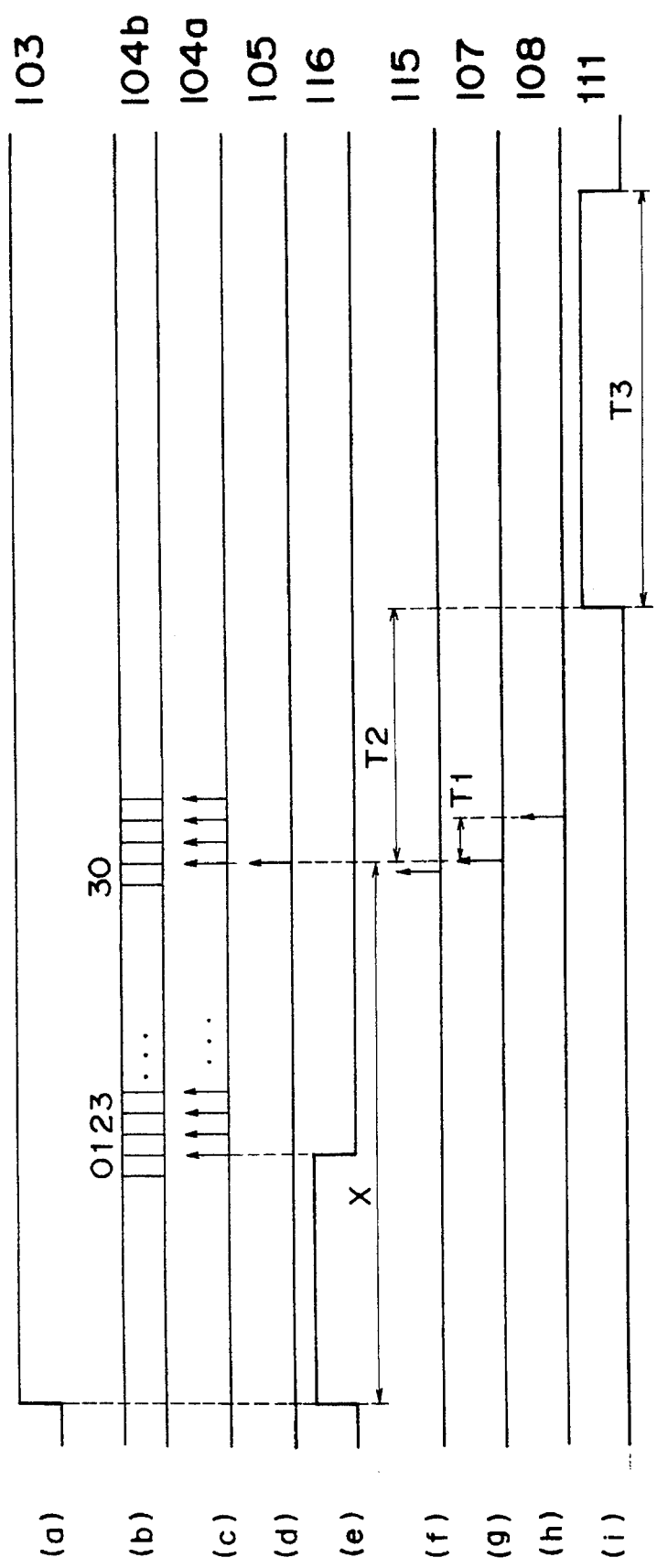
FIG. 5a is a timing chart indicating the operation of the apparatus of FIG. 1 in the case where a positioning signal has been detected.
Figure 5B:
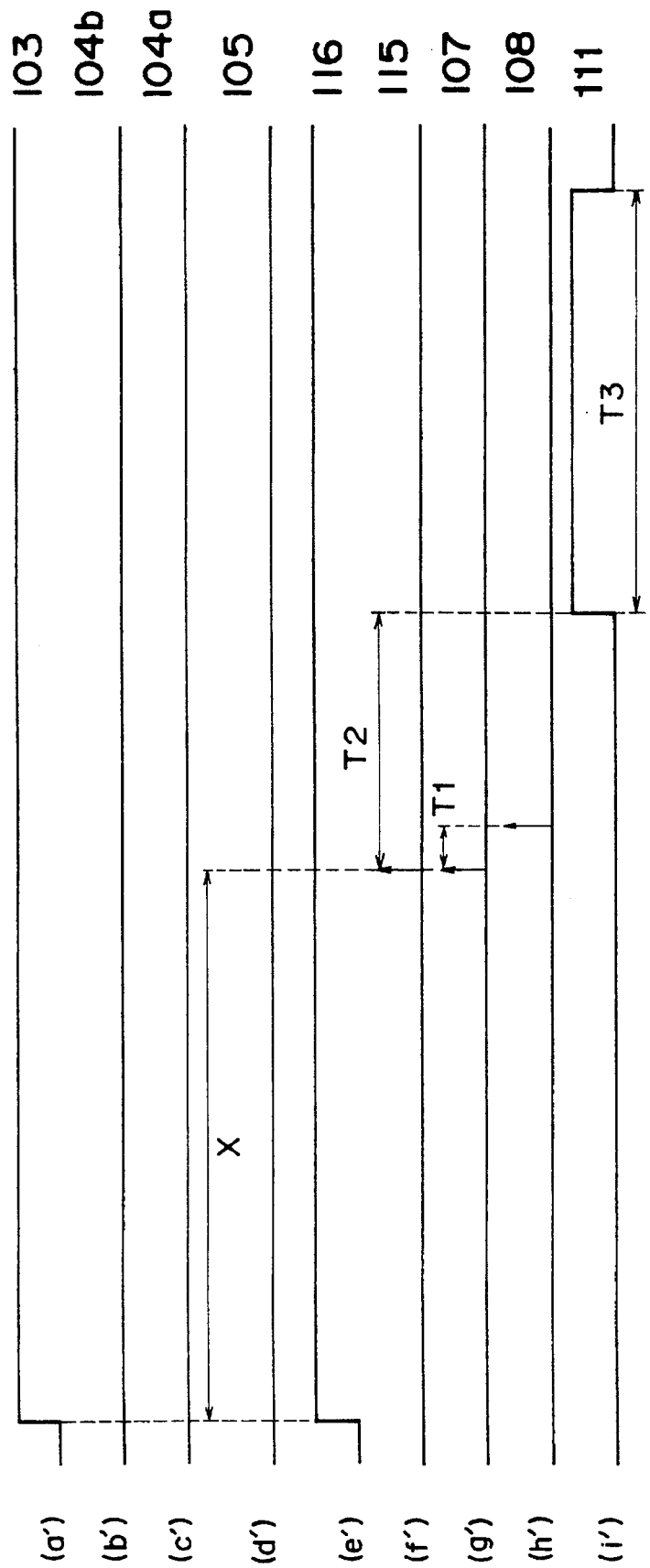
FIG. 5b is a chart similar to FIG. 5, but indicating the operation in the case where no positioning signal has been detected.

Each of FIGS. 5a and 5b depicts a timing chart indicating the sequence of operation of the elements shown in FIG. 4. In FIG. 5a, reference characters (a) through (i) indicate the operation at the time the positioning signal has been detected during scanning, whereas in FIG. 5b reference characters (a') through (i') indicate the operation at the time no positioning signal has been detected.

Referring back to FIG. 4, the reproduction signal 102 containing the positioning signal of the first region 31 is inputted to the positioning signal detector 7 which in turn detects a synchronous pattern of a small block constituting the positioning signal and captures a block address following it. Thereafter, the positioning signal detector 7 outputs a pulse signal 104a indicative of the detection of the block and an address value 104b thereof. In other words, the reproducing position signal 104 consists of two kinds of signals, the pulse signal 104a and the address value 104b thereof.

In practice, the positioning signal detector 7 carries out a detection of the synchronous pattern and a parity check of the address, and further carries out a check of the continuity of the address between blocks as occasion demands. When it is determined that the correct address has been detected, the positioning signal detector 7 outputs the pulse signal 104a and the address value 104b. The counter 52 loads the address value thereof when the correct address has been detected. Once the address value has been loaded, the counter 52 merely counts up at a time interval corresponding to one block length until a new address value is loaded. By so doing, if at least one of repeatedly appearing blocks is correctly detected, the number of succeeding blocks indicated by (b) in FIG. 5a can be known from the value indicated by the counter 54, and hence, the correct timing can be found out. The decoder 53 decodes a predetermined block number (30 in this embodiment) corresponding to the first timing, and outputs the reproduction timing signal 105.

On the other hand, the counter 54 is reset by an edge of the reference position signal 103. The reference position signal 103 is a signal which rises to a high level at a timing from which the head 1a starts scanning and falls to a low level at another timing from which the head 1b starts scanning. Thereafter, the counter 54 counts up at regular time intervals to measure the time elapsed. When the reproduction timing signal 105 is received by the register 55, the value of the counter 54, which indicates a period X in FIG. 5a or 5b, is stored in the register 55. If no reproduction timing signal is inputted to the register 55, the value thereof is not updated. The edge of the reference position signal 103 causes the timer 56 to load the value of the register 55, and the timer 56 outputs a pseudo (reproduction timing) signal 115 at the first timing at which the head 1a had read the positioning signal preceding one complete rotation of the cylinder 2 (or preceding two or more complete rotations of the cylinder 2 if no positioning signal had been read at such timing) i.e., at the same timing as the timing at which the reproduction timing signal had been obtained. If the rotation of the cylinder 2 is sufficiently stabilized, the positioning signal is detected at this time substantially at the same timing as the positioning signal had previously been detected. Accordingly, the reproduction timing signal 105 and the pseudo signal 115 are generated substantially at the same timing. Because of this, if the positioning signal detector 7 cannot detect the positioning signal contained in the reproduction signal due to, for example, drop-outs (defects on the tape) or a deviation in tracking position, the reproduction timing signal 105 can be replaced by the pseudo signal 115. The RS flip-flop 57 is set by the edge of the reference position signal 103 and is reset when the detection pulse 104a of the positioning signal is inputted thereto. The selector 58 selects the reproduction timing signal when an output 116 from the RS flip-flop 57 is at a low level and selects the pseudo signal when the output 116 is at a high level. After the selection, the selector 58 outputs the selected signal as the protection timing signal 107. Accordingly, as shown by (b) and (c) in FIG. 5a, if the small block of the positioning signal has been detected even once before the pseudo signal 115 is outputted, the selector 58 selects the reproduction timing signal generated on the basis of the positioning signal detected in the track.

As shown in FIG. 5b, if no positioning signal has been detected, this means that the RS flip-flop 57 is not reset and, therefore, the selector 58 selects the pseudo signal 115 indicative of the previously detected timing which is subsequently outputted therefrom as the protection timing signal 107.

As is clear from the above-discussed operation, the protection timing signal 107 is a timing signal corresponding to a specific location on the track, as viewed from the head, independently of whether or not the positioning signal has been detected.

It is to be noted here that, because the value of the register 55 of the timing memory 9 may become indeterminate at the initial starting unless otherwise treated, data determined by format or the like and indicative of the timing corresponding to the standard track position is preferably loaded as an initial value. By so doing, the head pulling-in operation can be speedily carried out at an initial stage of the tracking control.

Although not shown in the drawings, an appropriate clock signal is required in order to make each block shown in FIG. 4 by a digital circuit. The clock signal is generally prepared by equally dividing pulses outputted from a stable crystal oscillator (not shown). However, the block such as, for example, the positioning signal detector 7 in which processing must be performed in synchronism with the reproduction signal also includes means (not shown) for performing clock extraction from the reproduction signal using, for example, a PLL (phase locked loop).

In the above embodiment, although the operation has been discussed taking note of the head 1a, the same is true for the head 1b except that each of the rising edge shown by (a) in FIG. 5a and that shown by (a') in FIG. 5b is replaced by a falling edge.

In applications where a more accurate operation is required, the timing memory 9 preferably includes separate registers in association with the two heads 1a and 1b so that any one of the separate registers may perform storing for every scanning. The reason for this is that recording and reproduction are both affected by variations in the head mounting position on the cylinder 2 and by jitter within one rotation of the cylinder 2, and the actual time from the detection of the reference position signal indicative of the reference position of the cylinder 2 to the detection of the positioning signal varies for each head. However, in applications where a plurality of heads are mounted close to one another with sufficient accuracy, a single memory is serviceable for all the heads.

On the basis of the protection timing signal 107 obtained in this way and indicative of the timing corresponding to the reference position on the track, the sample timing signal 108 is generated in the sample timing generator 11 and is supplied to the sampler 14 at an appropriate timing shown by (h) in FIG. 5a. As discussed previously, this timing may be identical with the protection timing signal 107 shown by (g) in FIG. 5a or may be delayed by T1 therefrom, as shown by (h) in FIG. 5a. However, because this timing is used in sampling the tracking error, such a timing is required to be within a period in which, as viewed from the head 1a, the pilot signals from respective sides thereof can be observed. By way of example, although the track 34a adjoins the track 34b, as best shown in FIG. 2(a), an end portion of the first region 31 of the former is contiguous to a gap region of the latter following the first region 31 including the pilot signal of f1. Accordingly, a normal tracking error signal cannot be obtained at the end portion of the first region 31 of the track 34a, and hence, the sampling is required to be performed earlier. Furthermore, no sample timing signal is generated during a period in which the head 1b is scanning.

The insert recording operation is discussed hereinafter.

Upon receipt of the protection timing signal 107, the insert timing generator 12 outputs an insert timing signal 111 corresponding to a signal region into which an information signal is desired to be inserted at a timing indicated by the protection timing signal 107, e.g., the second region 32 in which audio signals have been recorded. As shown by (i) in FIG. 5a or by (i') in FIG. 5b, the insert timing signal 111 rises at a timing delayed T2 from the protection timing signal 107 and is maintained at a high level for a period of T3. This period of T3 is chosen to be identical with a period during which the head scans the audio region 32.

The protection timing signal 107 provides a timing required for the head to reproduce a specific location (in this example, the 30$^{th}$ small block in the first region) on the track. On the other hand, because the cylinder 2 is so controlled as to rotate at a constant speed, the speed at which the head scans the track is also constant. Accordingly, the time period from the timing indicated by the protection timing signal 107 to the arrival of the head at the audio region, and the time period during which the head scans the audio region can be calculated in advance.

Means for insert-recording is comprised of the insert recording signal generator 19 and the switch 4, in addition to the two heads 1a and 1b. The insert timing signal 111 is inputted to the switch 4 and the insert recording signal generator 19. When the insert timing signal 111 is at a high level, the movable element 4a of the switch 4 is brought into contact with the contact 5a, thereby switching the heads 1a and 1b from the reproducing condition to the recording condition. Furthermore, the insert timing signal 111 triggers the insert recording signal generator 19, thereby supplying a recording signal 112 to the heads 1a and 1b. In this way, recording on a target region is performed by the heads 1a and 1b.

It is to be noted here that in the above-described embodiment, although rewriting or additional writing is performed with respect to the second region, generally the same construction is applicable to the case wherein only reproduction is performed without any recording. In this case, the switch 4, the insert timing generator 12, and the insert recording signal generator 19 can be removed. The operation in this case is substantially the same as that discussed in the above embodiment except that reproduction is continued during the period in which the head 1a or 1b scans the second region. Even in this case, because the head pulling-in operation at the initial stage of the tracking control or the operation of restoring the head to a desired position on the track after removal of external disturbance is smoothly carried out, the condition in which the head cannot be restored does not occur, as is the case with the above-described embodiment.

It is also to be noted that although two kinds of tracking pilot signals are employed in the above-described embodiment, four kinds of pilot signals having respective different frequencies may be employed, as in an 8 mm video recorder. Alternatively, only one kind of pilot signal may be recorded on various locations on the tape, as in a digital audio tape recorder (DAT). In short, the present invention is not limited by how to record the pilot signal.

The present invention is also not limited by how to record the positioning signal, and it is sufficient if a synchronous signal having a predetermined frequency and recorded in advance is detected, as is the case with the DAT.

Furthermore, the tracking control section is not limited by that discussed in the foregoing embodiment, and it is sufficient if the head is so controlled as to follow a target track on the tape during scanning based on the tracking error signal which has been obtained from the pilot signals in the reproducing signal and has been sampled at a given timing.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A tape medium recording and/or reproducing apparatus for recording or reproducing information on or from a plurality of tracks on a tape medium, each of said plurality of tracks having first and second regions defined therein in a direction conforming to the direction of scan, each of said first regions having a position signal recorded therein while a tracking pilot signal is recorded in selected ones of the first regions, said tape medium recording and/or reproducing apparatus comprising:

a rotatable cylinder;

at least one magnetic head mounted on said cylinder for rotation together therewith, said magnetic head scanning the plurality of tracks successively to record or reproduce information on or from the second regions of the plurality of tracks on the tape medium and to reproduce the position signal from the first regions;

a rotational position detector means for detecting a rotational reference position of said cylinder to provide a reference position signal indicative thereof;

a positioning signal detector means for detecting the position signal in response to a reproduction signal from said magnetic head and for outputting a reproducing position signal indicative of a timing at which the position signal has been detected;

a reproduction timing generator means for generating a reproduction timing signal at a first timing determined by the reproducing position signal;

a timing memory means operable in response to the reproduction timing signal and the reference position signal to measure and store a length of time from the timing, at which the rotational reference position of said cylinder has been detected, to said first timing and also to output a signal indicative of the length of time;

a timing protector means for generating, when no positioning signal has been detected, a pseudo timing signal at said first timing and also for inserting the pseudo timing signal into the reproduction timing signal to provide a protection timing signal;

a sample timing generator means for outputting a sample timing signal at a second timing determined by the protection timing signal; and a tracking control means for controlling said magnetic head to appropriately scan a target track in reference to a level determined by leakage components of respective tracking pilot signals which have leaked into the reproduction signal from the neighboring first regions in which the tracking pilot signals had been recorded and which have then been sampled by the sample timing signal.

2. The tape medium recording and/or reproducing apparatus according to claim 1, wherein each one of said first regions in each one of said plurality of tracks is positioned at a leading portion of a track.

3. The tape medium recording and/or reproducing apparatus according to claim 1, wherein the position signal recorded in said first region is composed of a plurality of small blocks each having a synchronous pattern and a block address, and wherein said positioning signal detector means detects the synchronous pattern and the block address of each small block.

4. The tape medium recording and/or reproducing apparatus according to claim 1, wherein said second timing is identical to said first timing.

5. The tape medium recording and/or reproducing apparatus according to claim 1, further comprising an additional magnetic head mounted on said cylinder in angularly spaced relation with said one magnetic head, and wherein said timing memory means stores separately said length of time for each magnetic head.

6. A tape medium recording and/or reproducing apparatus for recording or reproducing information on or from a plurality of tracks on a tape medium each of said plurality of tracks having first and second regions defined therein in a direction conforming to the direction of scan, each of said first regions having a positioning signal recorded therein while a tracking pilot signal is recorded in selected ones of the first regions, said tape medium recording and/or reproducing apparatus comprising:

a rotatable cylinder;

at least one magnetic head mounted on said cylinder for rotation together therewith, said magnetic head scanning the plurality of tracks successively to record or reproduce information on or from the second regions of the plurality of tracks on the tape medium and to reproduce the position signal from the first regions;

a rotational position detector means for detecting a rotational reference position of said cylinder to provide a rotational reference position signal indicative thereof;

a positioning signal detector means for detecting the position signal in response to a reproduction signal from said magnetic head and for outputting a reproducing position signal indicative of a timing at which the position signal has been detected;

a reproduction timing generator means for generating a reproduction timing signal at a first timing determined by the reproducing position signal;

a timing memory means operable in response to the reproduction timing signal and the reference position signal to measure and store a length of time from the timing, at which the rotational reference position of said cylinder has been detected, to said first timing and also to output a signal indicative of the length of time;

a timing protector means for generating, when no positioning signal has been detected, a pseudo timing signal at said first timing and also for inserting the pseudo timing signal into the reproduction timing signal to provide a protection timing signal;

a sample timing generator means for outputting a sample timing signal at a second timing determined by the protection timing signal;

a tracking control means for controlling said magnetic head to appropriately scan a target track in reference to a level determined by leakage components of respective tracking pilot signals which have leaked into the reproduction signal from the neighboring first regions in which the tracking pilot signals had been recorded and which have then been sampled by the sample timing signal;

an insert timing generator means for outputting an insert timing signal at a third timing determined by the protection timing signal; and an insert recording means for recording on the second region at a timing indicated by the insert timing signal.

7. The tape medium recording and/or reproducing apparatus according to claim 6, wherein said first region in each one of the plurality of tracks is positioned at a leading portion of each one of the plurality of tracks.

8. The tape medium recording and/or reproducing apparatus according to claim 6, wherein the position signal recorded in said first region is composed of a plurality of small blocks each having a synchronous pattern and a block address, and wherein said positioning signal detector means detects the synchronous pattern and the block address of each small block.

9. The tape medium recording and/or reproducing apparatus according to claim 6, wherein said second timing is identical to said first timing.

10. The tape medium recording and/or reproducing apparatus according to claim 6, further comprising an additional magnetic head mounted on said cylinder in angularly spaced relation with said one magnetic head, and wherein said timing memory means stores separately said length of time for each magnetic head.

* * * * *